(12) United States Patent
Yabusaki et al.

(10) Patent No.: US 6,715,444 B1
(45) Date of Patent: Apr. 6, 2004

(54) METHOD AND DEVICE FOR MEASURING FREQUENCY OF SPECIFIC BEHAVIOR OF ANIMAL

(75) Inventors: Katsumi Yabusaki, Tsukuba (JP); Hiroshi Nakao, Tsuchiura (JP); Muneharu Ishikawa, Ryugasaki (JP)

(73) Assignee: Kowa Co., Ltd., Nagoya (JP)

( * ) Notice: Subject to any disclaimer, the term of this patent is extended or adjusted under 35 U.S.C. 154(b) by 16 days.

(21) Appl. No.: 10/129,272

(22) PCT Filed: Nov. 10, 2000

(86) PCT No.: PCT/JP00/07903

§ 371 (c)(1),
(2), (4) Date: May 3, 2002

(87) PCT Pub. No.: WO01/33953

PCT Pub. Date: May 17, 2001

(30) Foreign Application Priority Data

Nov. 11, 1999  (JP) .......................... 11/321108

(51) Int. Cl.[7] .................... A01K 1/03; G08B 23/00

(52) U.S. Cl. ................... 119/421; 340/573.3
(58) Field of Search ................. 119/417, 421, 119/719; 340/573.3

(56) References Cited

FOREIGN PATENT DOCUMENTS

| JP | 61-83964 | 4/1986 |
|---|---|---|
| JP | 61-88830 | 5/1986 |
| JP | 61-213768 | 9/1986 |
| JP | 9-206291 | 8/1997 |
| JP | 10-19658 | 1/1998 |

*Primary Examiner*—Charles T. Jordan
*Assistant Examiner*—Elizabeth Shaw
(74) *Attorney, Agent, or Firm*—Oblon, Spivak, McClelland, Maier & Neustadt, P.C.

(57) ABSTRACT

A method of measuring the number of times of a specific behavior of an animal in a breeding cage comprising a step in which a common pattern of the specific behavior is determined by receiving a signal of vibration of the cage caused by the specific behavior of the animal and extracting the feature of a frequency component of the signal, a step in which a measurement objective pattern is determined in the same way, and a step in which the common patterns in the measurement objective patterns is counted; a device for the measurement including means for detecting the vibration of the breeding cage, means for extracting the feature of the frequency component, and means for counting the common patterns in the measurement objective patterns; and a method for measuring the specific behavior such as a scratching of a small animal, e.g., a mouse in a breeding cage noninvasively, and an automatic measuring instrument.

8 Claims, 2 Drawing Sheets

METHOD AND DEVICE FOR MEASURING FREQUENCY OF SPECIFIC BEHAVIOR OF ANIMAL

TECHNICAL FIELD

The present invention relates to a method of measuring the number of times of a specific behavior, such as scratching, of a small animal, e.g., mouse in a breeding cage noninvasively, and an automatic measuring instrument for it.

BACKGROUND ART

Physiological or pharmacological researches have conventionally been made with the behavior of small animals such as mice as an index. For measurement of changes in the behavior, usually employed are visual observation, video recording, rotatable cage and the like. Particularly in the pharmacological researches of the scratching behavior of mice or rats to which a medicament inducing scratching has been administered, visual observation or observation using a recorded video is frequently employed, though the observation time is as short as 30 to 60 minutes.

Visual observation or observation through a recorded video is however accompanied with the problem that it requires not only labor but also time for acquiring data and in particular, success in observation through a recorded video depends on the position of a camera. An apparatus such as rotatable cage, on the other hand, involves the problem that animals are exposed to an excessive stress when placed under a special environment.

Various mice who spontaneously develop dermatitis and always display a scratching behavior have recently been found and their use for discovery of a scratching mechanism or searching of a new medicament is just started. In studies using such mice, observation over long hours becomes necessary and there is consequently a strong demand for the development of automatic measurement. An instrument for measuring scratching times by attaching a ring to the hind leg of such a mouse and measuring the movement of the leg through a magnetic sensor has recently been put on the market.

Small animals such as mice are forced to be under an unnatural state in such a measuring instrument and it takes long hours for them to get accustomed to the state. In addition, only the movement of the site to which the ring has been attached can be measured by such an instrument.

DISCLOSURE OF THE INVENTION

In consideration of the conventional problems and actual situations as described above, the present invention has been made. An object of the invention is to provide a method for measuring the number of times of a specific behavior, such as scratching, of small animals, e.g., mice in a breeding cage noninvasively; and an automatic measuring instrument for it.

With a view to attaining the above-described object, the present inventors have carried out an extensive observation and investigation on a change occurring when a mouse makes a move in a breeding cage. As a result, it has been found that the vibration of the cage due to the specific behavior of the animal shows a peculiar frequency and strength pattern, leading to the completion of the invention.

The above-described object is attained by a method of measuring the number of times of a specific behavior of an animal in a breeding cage, which comprises a first step of detecting vibration of the cage caused by the specific behavior of the animal as an electrical signal, extracting the feature of a frequency component of the signal and determining a common pattern of the frequency and strength of the specific behavior of the animal;

a second step of detecting, as an electrical signal, vibration of the cage caused by all the behaviors of the animal in the breeding cage within a certain time, extracting the feature of a frequency component of the signal and determining a measurement objective pattern of the frequency and strength of all the behaviors of the animal; and a third step of comparing the common pattern obtained in the first step with the measurement objective pattern obtained in the second step, and counting the number of the common patterns existing in the measurement objective patterns.

The above-described object is also attained by an automatic measuring instrument of the number of times of a specific behavior of an animal in a breeding cage, which comprises:

means for detecting vibration of the cage caused by the behavior of the animal as an electrical signal, means for extracting the feature of a frequency component of the signal thus detected, and means for comparing a common pattern of the frequency and strength thus extracted with a measurement objective pattern and counting the number of common patterns in the measurement objective patterns.

BRIEF DESCRIPTION OF THE DRAWINGS

FIG. 1 is a schematic block view of the invention instrument, while

FIG. 4 illustrates analysis and histogram of frequency upon scratching behavior, while

Figure 1:
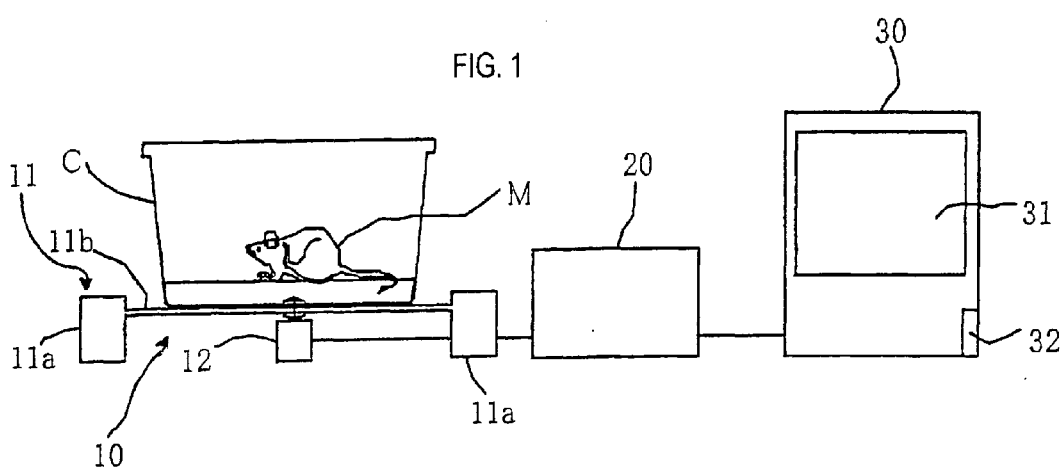

Legends in FIGS. 1 to 5 are as follows:

10: vibration detector
11: breeding cage stand
11a: underframe
11b: supporting member
11c: locking member
12: displacement sensor portion
20: frequency analyzer
30: arithmetic unit
C: breeding cage
M: animal

BEST MODE FOR CARRYING OUT THE INVENTION

The embodiment of the invention will hereinafter be described based on the accompanying drawings.

Figure 2:
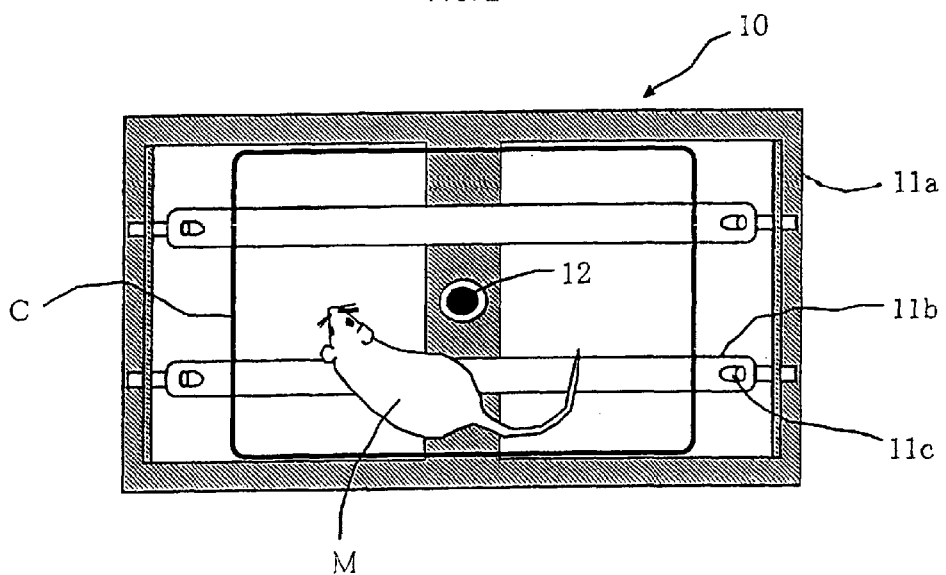
FIG. 2 is a schematic plan view of a vibration detector.

FIGS. 1 and 2 illustrate the instrument of the invention. According to these drawings, indicated at numeral 10 is a vibration detector for detecting, as electrical signals, the vibration of a breeding cage C caused by the behavior of an animal M in the cage C. This vibration detector 10 is made of a breeding cage stand 11 and a displacement sensor portion 12.

There is no limitation imposed on the specific structure of the breeding cage stand 11 insofar as it is capable of transmitting the vibration of the breeding cage C. For example, that having, between opposite two frames of an underframe 11a, a supporting member 11b such as leaf spring or drumskin installed, at a fixed tension, by means of locking members 11c such as hooks is preferred.

As the displacement sensor portion 12, any kind is usable insofar as it is capable of detecting the displacement of the breeding cage C as an electrical signal. Examples include eddy current proximity displacement sensor capable of detecting the displacement through a metal piece adhered onto the bottom surface of the breeding cage, laser displacement meter, load cell for detecting the displacement of the breeding cage stand 11, and a strain gauge.

Indicated at numeral 20 is a frequency analyzer using Fourier function. Being equipped with an amplifier for amplifying an electrical signal detected at the displacement sensor portion 12 and an A/D converter for converting the signal into a digital signal, it extracts the feature of a frequency component of the electrical signal.

Indicated at numeral 30 is an arithmetic unit. It exhibits, at its display portion 31, a pattern of strength and frequency extracted by the frequency analyzer 20 and at the same time, stores it in a memory portion 32 as needed. This arithmetic unit 30 serves to compare the common pattern of the specific behavior of an animal extracted by the frequency analyzer 20 with a measurement objective pattern, thereby counting the number of the common patterns existing in the measurement objective patterns.

EXAMPLES

The present invention will hereinafter be described in further detail by Examples.

Example 1

Figure 3:
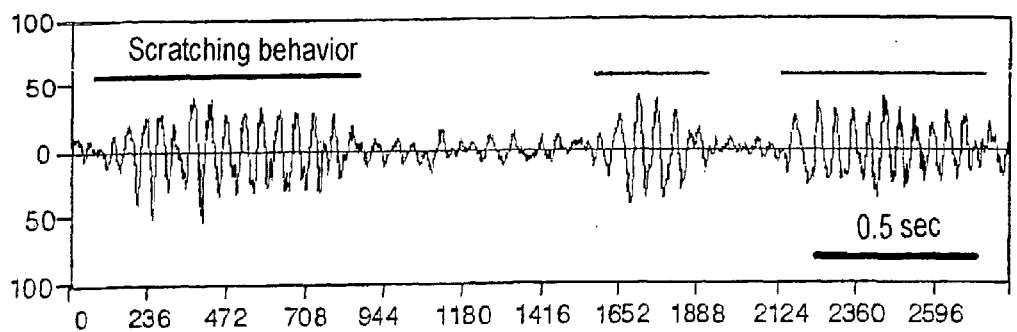
FIG. 3 is a signal detected by the vibration detector.

The invention instrument as illustrated in FIGS. 1 and 2 was used. On a breeding cage stand 11 of the instrument, a breeding cage C having a mouse M housed therein was disposed. The vibration of the cage C including a scratching behavior of the mouse M was detected as an electrical signal by the displacement sensor portion 12 (eddy current displacement meter). The results are as shown in FIG. 3. After amplification of the signal thus detected by a frequency analyzer 20 and conversion of it into a digital signal, the feature of a frequency component upon scratching behavior was extracted using a Fourier function and a pattern of the frequency and strength were found. As is apparent from the histogram of FIG. 4, a particularly strong peak was observed at a frequency around 20 Hz. The frequency upon non-scratching behavior was analyzed similarly, resulting in that no strong peak was observed at a frequency around 20 Hz as illustrated in the histogram of FIG. 5.

The analysis of a frequency in this specification was conducted in accordance with FFT (Fast Fourier Transformation), a technique for conducting discrete Fourier transformation at a high speed. In discrete Fourier transformation, an infinite intervallic integral in the ordinary Fourier transformation is replaced with a finite summation and both the time domain and frequency domain are made discrete. Discrete Fourier transformation from discrete data of a time domain consisting of N element pieces ($a_0, a_1, \ldots, a_{N-1}$) to discrete data of a frequency domain consisting of k element pieces ($A_0, A_1, \ldots, A_{K-1}$) follows the below-described equation:

$$A_k = \sum_{j=0}^{N-1} a_j e^{-2jk\pi i/N}$$

wherein π stands for the ratio of a circle's circumference to its diameter and i stands for an imaginary number.

Figure 4:
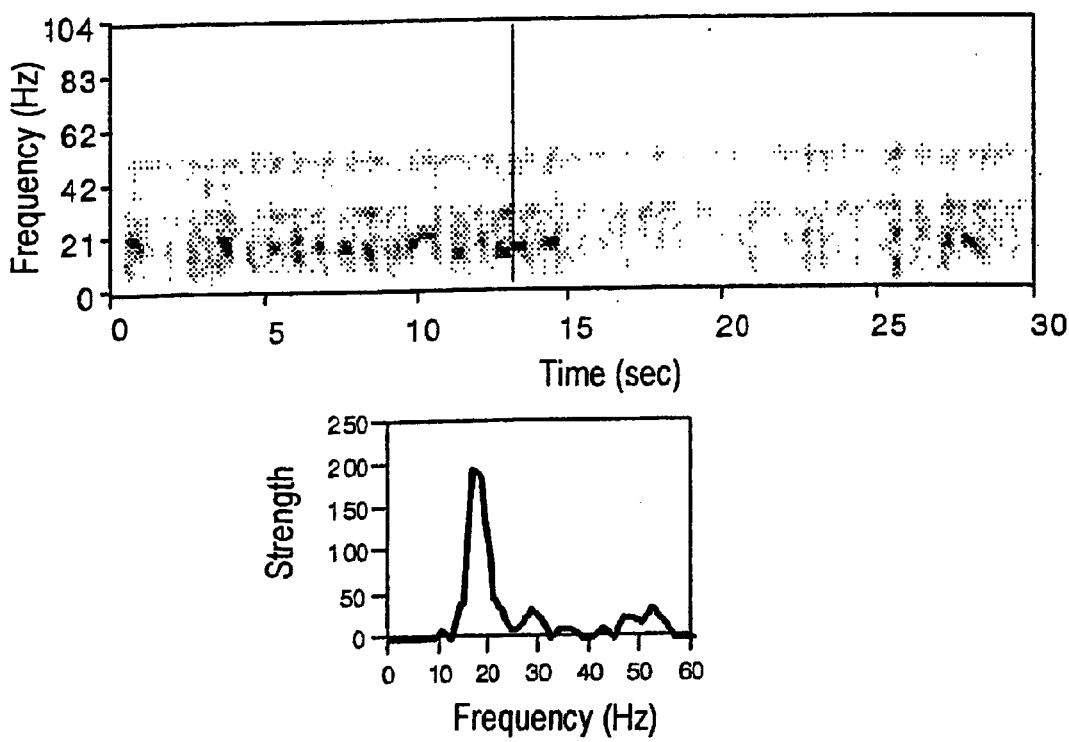
Figure 5:
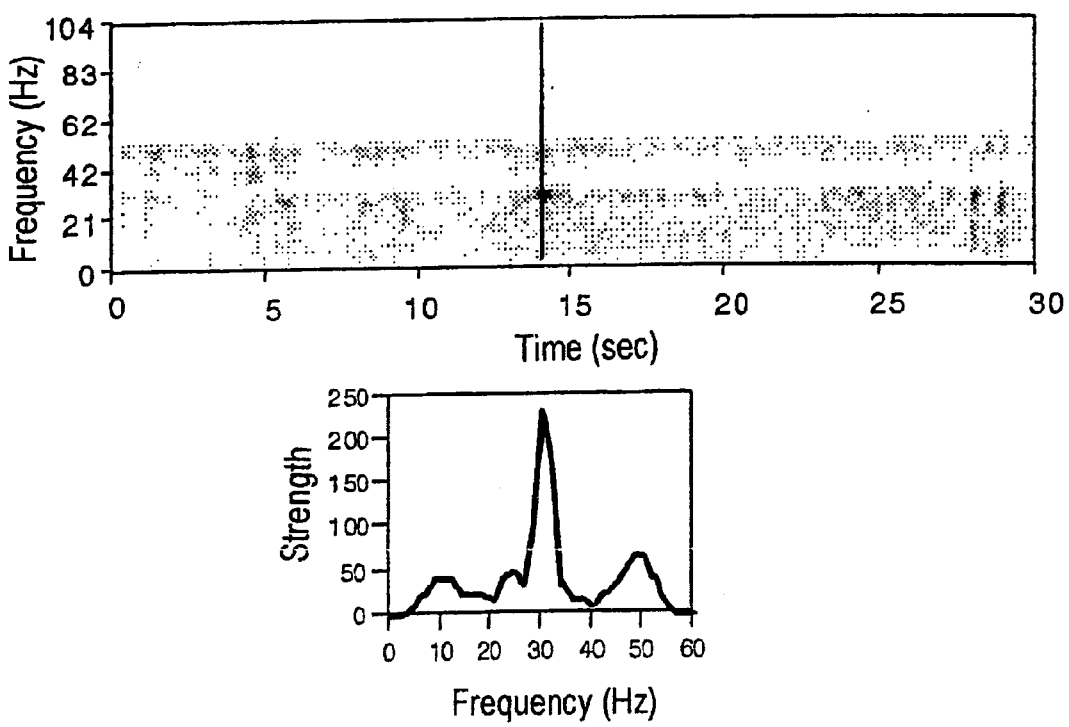
FIG. 5 illustrates analysis and histogram of frequency upon non-scratching behavior.

The histogram of FIG. 4 was input in the arithmetic unit 30 in advance as a common pattern of the scratching behavior of a mouse. As described above, the vibration of the breeding cage C having a measurement objective mouse housed therein was detected for 30 seconds as an electrical signal. Based on the analysis of the frequency, the measurement objective pattern of frequency and strength was determined. As a result of automatic counting by the arithmetic unit 30, the number of common patterns existing in the measurement objective patterns was found to be 13 (times). This coincided with the number 13 of the visually observed scratching times.

INDUSTRIAL APPLICABILITY

In the physiological or pharmacological research using a scratching behavior as an index, the present invention makes it possible to automatically, efficiently and noninvasively count the number of times of a specific behavior of an animal such as mouse in a breeding cage, that is, without changing the environment under which the animal is placed.

What is claimed is:

1. A method of measuring the number of times of a specific behavior of an animal in a breeding cage, which comprises a first step of detecting vibration of the cage caused by the specific behavior of the animal as an electrical signal, extracting the feature of a frequency component of the signal and determining a common pattern of the frequency and strength of the specific behavior of the animal;

a second step of detecting, as an electrical signal, vibration of the cage caused by all the behaviors of the animal in the breeding cage within a certain time, extracting the feature of a frequency component of the signal and determining a measurement objective pattern of the frequency and strength of all the behaviors of the animal; and a third step of comparing the common pattern obtained in the first step with the measurement objective pattern obtained in the second step, thereby counting the number of the common patterns existing in the measurement objective patterns.

2. A measuring method of claim 1, wherein the specific behavior of the animal is scratching.

3. A measuring method of claim 1 or 2, wherein the feature of a frequency component is extracted by analysis of frequency using Fourier function.

4. A measuring method of claim 1 or 2, wherein the feature of a frequency component is extracted by analogue band-pass filter.

5. An automatic measuring instrument for measuring the number of times of a specific behavior of an animal in a breeding cage, which comprises:

means for detecting vibration of the cage caused by the behavior of the animal as an electrical signal, means for extracting the feature of a frequency component of the signal thus detected, and means for comparing a common pattern of frequency and strength based on the results of detection with a measurement objective pattern and counting the number of the common patterns in the measurement objective patterns.

6. An automatic measuring instrument of claim 5, wherein the means for detecting, as an electrical signal, vibration of the breeding cage caused by the specific behavior of the animal in the cage is made of a breeding cage stand capable of transmitting vibration and a displacement sensor portion.

7. An automatic counting instrument of claim 5 or 6, wherein the means for extracting the feature of a frequency component is a frequency analyzer using Fourier function.

8. An automatic measuring instrument of claim 5 or 6, wherein the means for extracting the feature of a frequency component is an analogue band-pass filter.

* * * * *